(12) United States Patent
Shibata

(10) Patent No.: US 6,290,764 B1
(45) Date of Patent: Sep. 18, 2001

(54) INK FOR ELECTROSTATIC INK JET PRINTING

(75) Inventor: Hiroshi Shibata, Fukuoka-ken (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/515,867

(22) Filed: Feb. 29, 2000

(30) Foreign Application Priority Data

Mar. 4, 1999 (JP) .................................................. 11-056514

(51) Int. Cl.$^7$ ...................................................... C09D 11/02
(52) U.S. Cl. ..................................... 106/31.57; 106/31.65; 106/31.88; 106/31.33
(58) Field of Search ............................. 106/31.33, 31.57, 106/31.65, 31.88

(56) References Cited

U.S. PATENT DOCUMENTS 5,453,121 * 9/1995 Nicholls et al. .................. 106/31.66
5,952,048 * 9/1999 Tsubuko et al. .................... 427/288

FOREIGN PATENT DOCUMENTS

| 7502218 | 3/1995 | (JP) . |
| 8291267 | 11/1996 | (JP) . |
| 8512069 | 12/1996 | (JP) . |
| 9193389 | 7/1997 | (JP) . |

* cited by examiner

Primary Examiner—Helene Klemanski
Assistant Examiner—Veronica F. Faison
(74) Attorney, Agent, or Firm—Stevens, Davis, Miller & Mosher, LLP

(57) ABSTRACT

Ink for an electrostatic ink jet printer in which, inter alia, the ink and its insulative solvent and color material particle have the following properties: the ink has a volume resistivity of $10^9$ to $10^{12}$ Ωcm and a viscosity of 2 to 20 cp; the insulative solvent has a volume resistivity equal to or more than $10^{10}$ Ωcm; and the color material particle has an average diameter of between 0.1 and 2 μm, an absolute value for the ratio (ξ electric potential/viscosity) between 10 to 100 (mV/cp), and an absolute value for the ξ electric potential of 30 mV to 200 mV. By means of these conditions, the ink provides higher density images, especially at faster printing speeds.

5 Claims, 5 Drawing Sheets

INK FOR ELECTROSTATIC INK JET PRINTING

FIELD OF THE INVENTION

The present invention relates to an ink employed for an ink jet printing apparatus, and particularly to an ink for an electrostatic ink jet printing which is used in an electrostatic ink jet printing apparatus cohering and discharging color material particles in the ink due to an electrostatic force so as to apply a printing to a recording medium.

BACKGROUND INFORMATION

An increased attention is recently paid to a non-impact printing technique in view that a generation of a sound at a recording time is significantly as small as can be ignored.

In particular, an ink jet method which can print on a plain paper at a high speed by using a comparatively simple mechanism is a significantly useful printing technique, various kinds of techniques have been suggested, and a technique which is suitable for a high speed printing, a high resolution and a full color printing has been eagerly going to be researched. Among them, there is representatively a multi nozzle type which prints a plurality of dots in parallel, for example, a bubble jet method which discharges an ink drop due to a pressure of a steam generated by a heat of a heat generating body and a piezoelectric method which discharges an ink drop due to a mechanical pressure pulse generated by a piezoelectric element.

However, there is a problem that the conventional ink jet printer is not suitable for improving a resolution. That is, in the bubble jet method which employs the pressure of the steam, it is hard to generate an ink drop having a diameter smaller than 20 $\mu$m, and in the piezoelectric method which employs the pressure generated by the piezoelectric element, it is hard to produce a head having a high resolution due to a problem on a processing technology since the recording head has a complex structure.

Further, the ink employed in the conventional ink jet method has a lot of technical problems.

In this case, as characteristics required in the ink for the ink jet, firstly, an even image having a high density without a bleeding and a photographic fog can be obtained on a paper, secondly, a weather resistance of the image is good, thirdly, a drying property of the ink is good on the paper, and fourthly, no clogging is generated and a discharge stability and a discharge response are excellent.

In order to obtain these characteristics, there has been proposed various kinds of electrostatic ink jet methods which apply a voltage on an electrode array formed in a thin film and employ an electrostatic force so as to discharge the ink.

Here, a description will be given of a technique disclosed in Japanese Patent National Publication of translated version 7-502218, as the conventional electrostatic type ink jet method.

The conventional electrostatic ink jet technique in accordance with the publication is structured such as to apply a voltage having the same polarity as that of a charged color material particle to an electrode at a front end of a slit so as to form an aggregate of the color material particles and discharge the aggregate of the color material particles from a front end of a printing electrode.

Then, in accordance with the technique, since the color material particles are discharged in a cohered state, an ink having a little solvent is formed on the paper as a dot, so that a printing having a high density and a less bleeding can be realized. Further, since the solvent is reduced, the ink is quickly dried on the printing medium. Further, since a pigment is employed for the color material particles of the ink as is different from the other ink jet methods which employ a dye ink, it is possible to obtain an image having an improved weather resistance.

Further, in the conventional electrostatic type ink jet technique, since the printing head is structured such as to be formed in a slit shape which does not require independent nozzles at every dots, it is effective for preventing and repairing a clogging which causes a great problem for putting the ink jet head to a practical use, so that the discharge stability is always good and a reliability can be maintained.

Further, the conventional electrostatic ink jet technique can easily form a printing dot having a diameter about 10 to 20 $\mu$m in accordance with a length of a printing signal pulse, and can also form a large printing dot having a diameter equal to or more than 100 $\mu$m. Accordingly, since it is possible to achieve a multi value area gradation as well as a high resolution, it can be said to be an ink jet method which is most suitable for obtaining a high resolution and a full color.

Hereinafter, a description will be given of a structure and an ink discharge process of an electrostatic type ink jet head, and a characteristic of an ink for the electrostatic type ink jet. In this case, hereinafter, the ink for the electrostatic type ink jet is simply referred to as an ink.

FIG. 1 is a schematic view which shows a structure of an electrostatic type ink jet head, FIG. 2 is a schematic view which shows a structure of an inner portion of the electrostatic type ink jet head shown in FIG. 1, FIG. 3 is a side cross sectional view of the electrostatic type ink jet head shown in FIG. 1, and FIGS. 4 to 7 are schematic views which show a discharge motion of an ink performed by the electrostatic type ink jet head shown in FIG. 1 in a subsequent manner.

As illustrated, a printing head has a lower casing 7 and an upper casing 8 which are bonded to each other so as to be integrally formed. A slit hole 2 is formed at a front end of the printing head, and a plurality of printing electrodes 1 which are driven by a printing electrode driver so as to discharge an ink drop are provided in such a manner as to extend inward from the slit hole 2.

A front end of the printing electrode 1 s formed in a convex shape and is placed so as o protrude from the slit hole 2 corresponding to discharge hole at a degree of 50 to 200 $\mu$m so that the printing electrode 1 can concentrate an electric field to the ink existing near the front end of the printing electrode 1 and a stable discharge can be performed by stably forming a meniscus.

Further, the printing electrode 1 is constituted by a lead wire 3 for applying a signal voltage, and a tab wiring substrate 4 which is integrally formed with a pad (not shown) for being electrically connected to the printing electrode driver.

An ink tank 6 in which an ink is charged is formed within the printing head by an opposing space between the lower casing 7 and the upper casing 8 so as to be communicated with the slit hole 2. A migration electrode 5 is provided on an inner surface of the ink tank 6 for applying an electrophoresis in a direction of the slit hole 2 to the color material particle within the ink tank 6 and increasing a density of the color material near the slit hole 2.

Here, the tab wiring substrate 4 and the migration electrode 5 mentioned above are bonded to the lower casing 7.

Further, the pad is bonded to an FPC wiring substrate (not shown). In this case, a matrix circuit, a driver IC and the like are mounted on the FPC wiring substrate.

As shown in FIG. 4, in this electrostatic type ink jet head, in a state that the ink is charged within the ink tank 6 and within a slit-like ink flow passage, the ink forms a meniscus 9 within a periphery of the slit hole 2 due to a surface tension. Then, since a back pressure about ±100 Pa is applied to the ink within the ink tank 6, the meniscus 9 is formed in a state of gently protruding from the ink discharge hole.

In this case, a printing paper 10 corresponding to a printing medium for the ink is arranged in a direction of discharging the ink, and an opposing electrode 11 which discharges the ink toward the printing paper 10 due to an electrostatic force is arranged on a back surface of the printing paper 10. In this case, in the case that a color material particle 12 is charged in a positive potential, a negative voltage about −1 kV is applied to the opposing electrode 11 at a time of printing, whereby a potential difference with respect to the printing electrode 1 is controlled. Further, as a voltage applied to the printing electrode 1, a positive voltage in a range between 200 and 1000 V is used. However, a printing voltage has no upper limit, and is generally determined in accordance with a specification of a usable driver IC. Since the driver IC tends to be expensive as the drive voltage becomes higher, in the case of using an electrostatic ink jet printer as a wide use printer for an office and a personal use, an inexpensive printer can be provided when a signal voltage is made lower.

A description will be given of an ink discharge operation by the electrostatic type ink jet head having the structure mentioned above with reference to FIGS. 4 to 7.

FIG. 4 shows a state that a printing is not performed. A voltage is applied to the opposing electrode 11 and a voltage is not applied to the printing electrode 1. In this state, the meniscus 9 is formed in the slit hole 2 in such a manner as to gently protrude along a shape of a front end of the printing electrode. Then, at a time of printing, the charged color material particle 12 within the ink tank 6 is performed an electrophoresis in a direction of the slit hole 2 corresponding to the front end of the printing electrode 1 when a voltage equal to or more than the printing voltage is applied to the migration electrode 5 (refer to FIGS. 2 and 3). At this time, when a signal pulse voltage is applied to the printing electrode 1 by the printing electrode driver, an electric field is concentrated to the front end of the printing electrode 1 and the color material particle 12 is cohered, so that the meniscus 9 constituted by the color material particle 12 having a high density and a little amount of solvent starts deforming.

Then, as shown in FIG. 5, the meniscus 9 is formed in an ink drop shape due to the electrostatic force and grows toward the opposing electrode 11.

Then, finally, as shown in FIG. 6, an ink drop 13 is separated from the meniscus 9 and is discharged in a state of a liquid drop.

When the signal pulse voltage is turned off, the discharged ink drop is attached to the printing paper 10 arranged between the printing electrode 1 and the opposing electrode 11, as shown in FIG. 7. Finally, the ink is heated and fixed to the printing paper 10 by a heater (not shown), thereby printing on the printing paper 10.

When the discharge of a desired ink drop 13 is finished, the color material particle 11 within the ink tank 6 moves in a direction of the slit hole 2, whereby the color material particle 11 is supplied near the printing electrode 1 and as shown in FIG. 7, the meniscus 9 of the printing electrode 1 is formed in the slit hole 2 so as to gently protrude along the front end shape of the printing electrode 1 in the same manner as that of an initial state before discharging the ink.

Thereafter, the operation of discharging the ink mentioned above is repeated, and the printing is continuously performed.

The ink discharge in the electrostatic type ink jet head mentioned above is characterized by increasing a density of the color material particle 12 near the discharge position so as to take out the ink having a high color material particle density. Then, since the ink which is taken out includes the color material particle 12 having a high density and the same polarity, the ink is separated due to an electrostatic repulsion between the color material particles 12 so as to form fine ink drops and is discharged toward the opposing electrode 11. The electrostatic type ink jet heat mentioned above is characterized by injecting the color material particle 12 in a state of making the density of the color material particle 12 in the ink higher than that of the original ink, thereby improving a selecting property of generating the ink drop from each of the printing electrodes 1 by utilizing the difference in density of the color material particle.

Next, a description will be given of a characteristic of a conventional ink employed for the electrostatic type ink jet head.

For example, in Japanese Patent National Publication of translated version 8-512069, there is disclosed an ink composition for an ink jet which contains a solvent having an electric resistance equal to or more than $10^9$ Ωcm, a marking particle being insoluble and capable of being electrically charged, a particle charging agent, and is structured such as to be indispensable for the ink used in the conventional electrostatic type ink jet head.

That is, the conventional ink is characterized by using the ink in which the color material particle charged in the solvent having a high volume resistivity is dispersed. The details thereof is not disclosed in the publication, however, generally, for example, there is employed an isoparaffin hydro carbon, a silicone oil or the like is employed for the solvent, and an ink constituted by a color material structured such as to contain a color material particle such as a carbon black or the like on a binder made of a resin or a wax or a surface, a dispersing agent, an electric charge controlling agent and the like.

Here, a dielectric solvent having a high electric resistivity is required for the solvent. This is because the electric field applied to the ink can reach the color material particle via the solvent by employing the dielectric solvent. Then, in order to perform an electrophoresis the color material particle, it is necessary to charge the color material particle itself. Since a fixed liquid drop amount of color material particle is discharged from the ink by utilizing the electrostatic repulsion, a static amount of the charge is required.

Further, the ink contains an addition agent. That is, for example, adding a dispersion assisting agent to a printing liquid, the color material particle can stably disperse in the solvent without being cohered.

Further, by adding the electric charge controlling agent to the ink, it is possible to improve an electric charge characteristic of the color material particle.

As mentioned above, the ink can be obtained by mixing the resin, the coloring agent and the particle electric charging agent and dispersing the color material particle obtained by pulverizing to a desired diameter of the particle, in the solvent together with a little amount of dispersion assisting agent.

Further, in Japanese Patent Unexamined Publication No. 9-193389, there is disclosed an ink adjusted so as to have an electric resistivity equal to or more than $10^8$ Ωcm by dispersing a developing particle having a predetermined polarity, a dielectric solvent having an electric resistivity equal to or more than $10^{10}$ Ωcm, an ink constituted by a developing particle having a ζ potential equal to or more than 60 mV, an average diameter of the particle between 0.01 and 5 µm and an electric resistivity equal to or more than $10^8$ Ωcm, and the like. In the ink mentioned above, since no bleeding is generated on various kinds of printing medium, it is suitable for a high quality printing.

Further, in Japanese Patent Unexamined Publication No. 8-291267, there is disclosed an ink in which an amount of specific image (Q/M) of a charged particle is between 10 and 1000 µC/g and an electric resistance of an ink composition is equal to or more than $10^{10}$ Ωcm. In the ink mentioned above, since the ink is discharged by a low applied voltage, it is suitable for a printing having a high image density, a high contrast and a high resolution.

However, in the conventional ink mentioned above, there is the following problems at a time of cohering the color material particles so as to discharge.

That is, since the electrostatic type ink jet is structured such as to collect the color material particles having a high density to the front end of the printing electrode due to an electrophoresis, it takes a comparatively long time to perform an electrophoresis the color material particles so as to reach near the printing electrode. Accordingly, in the case of printing in a high printing frequency, there is a case that the color material particles are insufficiently supplied to the printing electrode, thereby being discharged in a low density of the color material or not being discharged. Then, as a result thereof, a printing density becomes light and a dispersion of a diameter of the printed dot becomes large, thereby deteriorating a printing quality.

However, the conventional ink mentioned above defines a material value of the ink in view of a high quality image. That is, since there is no description concerning the material value of the ink which corresponds to a factor of the printing frequency, it is not said that the ink takes an improvement of the printing frequency into consideration.

Then, in order to realize the ink which can obtain a high quality image even by printing at the high printing frequency, it is necessary to define the material value of the ink in view of the printing frequency, for example, in view of increasing a speed of the electrophoresis of the color material particle so as to supply the color material particle near the printing electrode at a high speed and in a stable manner.

SUMMARY OF THE INVENTION

Accordingly, an object of the present invention is to provide an ink for an electrostatic type ink jet in which a high quality image can be stably obtained by printing in a high density even at a high printing frequency.

In order to solve the problem, in accordance with the present invention, there is provided an ink for an electrostatic type ink jet comprising an ink tank which holds an ink obtained by dispersing a color material particle in an insulative solvent, a slit hole or a nozzle hole which is formed so as to be communicated with the ink tank and from which the ink is discharged, a migration electrode which transfers the color material particle in the ink due to an electrophoresis, and a printing electrode which discharges the color material particle and the insulative solvent migrated by the migration electrode from the slit hole or the nozzle hole, wherein the improvement comprises an insulative solvent having a volume resistivity equal to or more than $10^{10}$ Ωcm, a color material particular which can be electrically charged, and an electric charge controlling agent which applies a function of electrically charging to a predetermined polarity to the color material particular, and the following material values A to E are provided:

A: a volume resistivity of the ink for the electrostatic type ink jet is $10^9$ to $10^{12}$ Ωcm;

B: an average diameter of the color material particle is between 0.1 and 2 µm;

C: an absolute value of a ratio (ζ electric potential/viscosity) between a ζ electric potential and a viscosity of the color material particular is 10 to 100 (mV/cp);

D: a viscosity of the ink for the electrostatic type ink jet is 2 to 20 cp; and

E: an absolute value of the ζ electric potential of the color material particle is 30 mV to 200 mV.

Accordingly, it is possible to stably obtain a high quality image by printing in a high density even at a high printing frequency.

DETAILED DESCRIPTION

Figure 1:
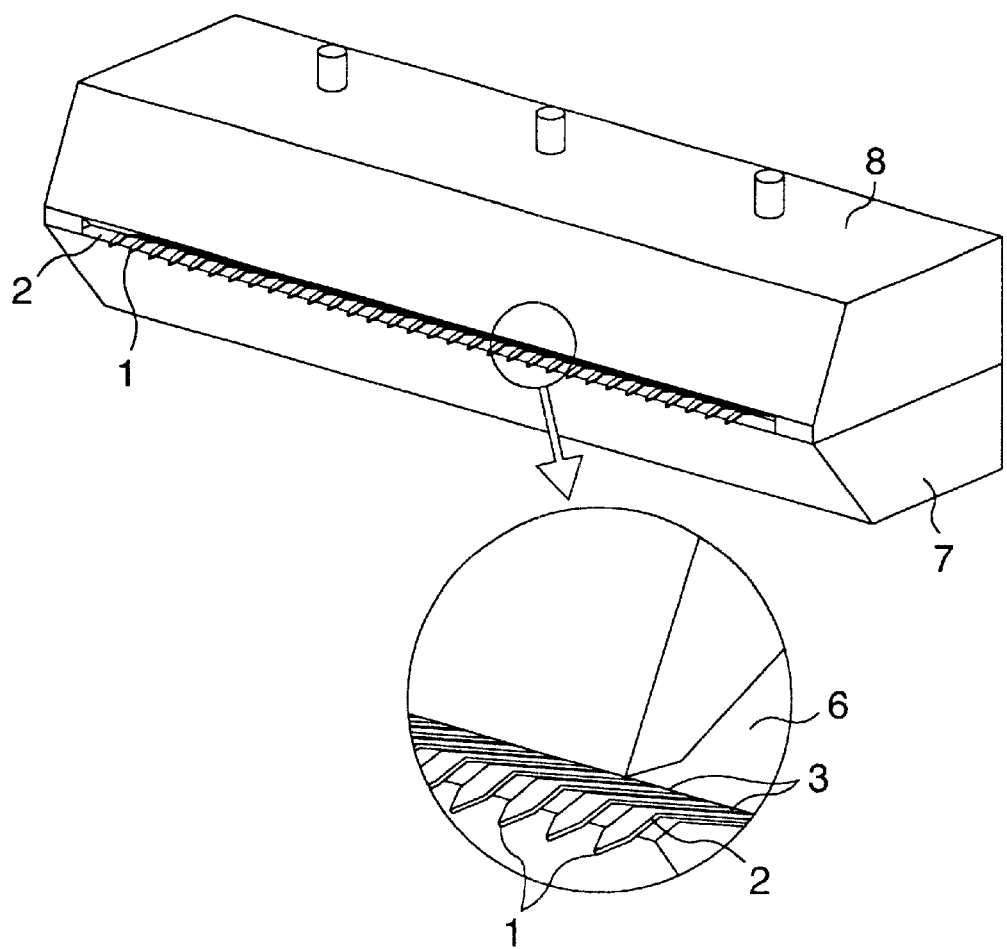
FIG. 1 is a schematic view which shows a structure of an electrostatic type ink jet head.
Figure 2:
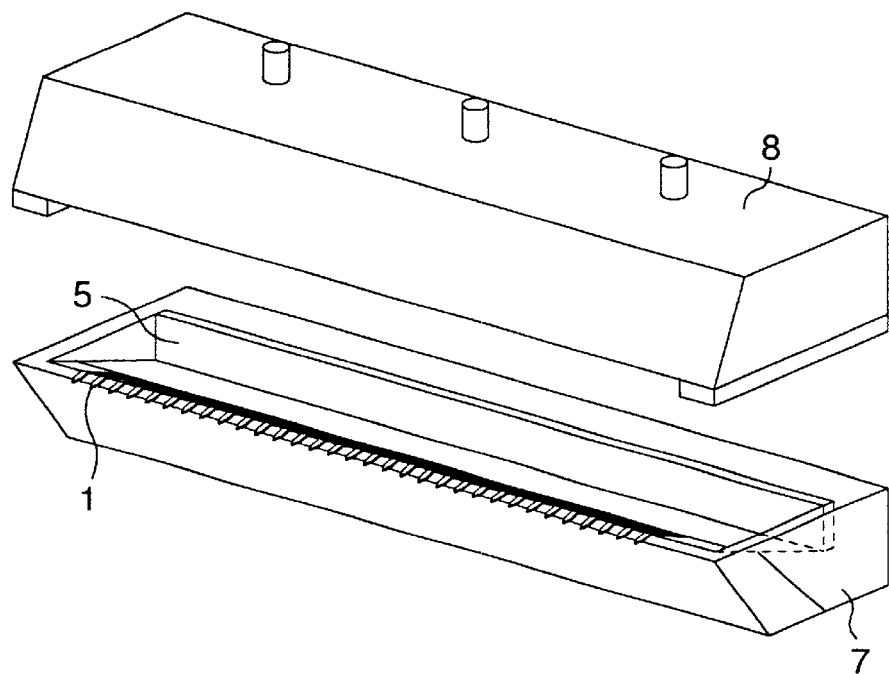
FIG. 2 is a schematic view which shows a structure of an inner portion of the electrostatic type ink jet head shown in FIG. 1.
Figure 3:
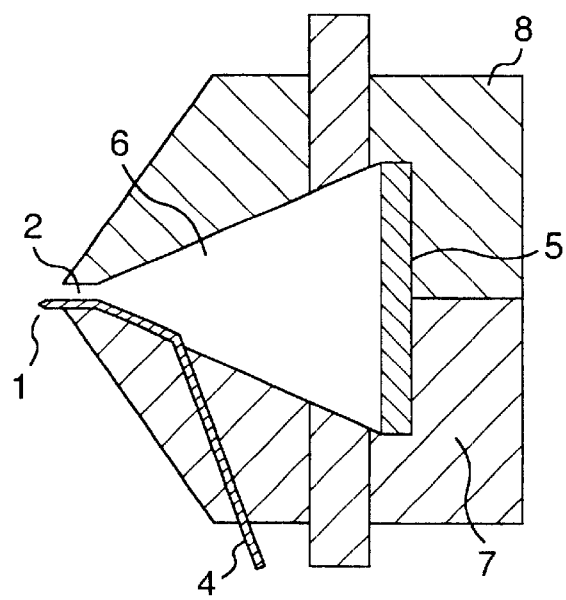
FIG. 3 is a side cross sectional view of the electrostatic type ink jet head shown in FIG. 1.
Figure 4:
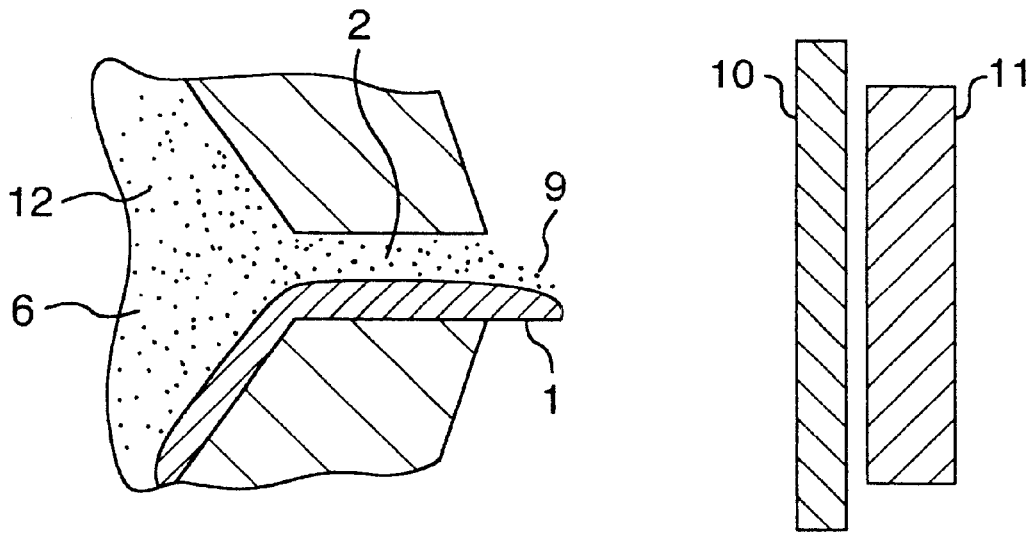
FIG. 4 is a schematic view which shows a part of an ink discharging motion by the electrostatic ink jet head shown in FIG. 1.
Figure 5:
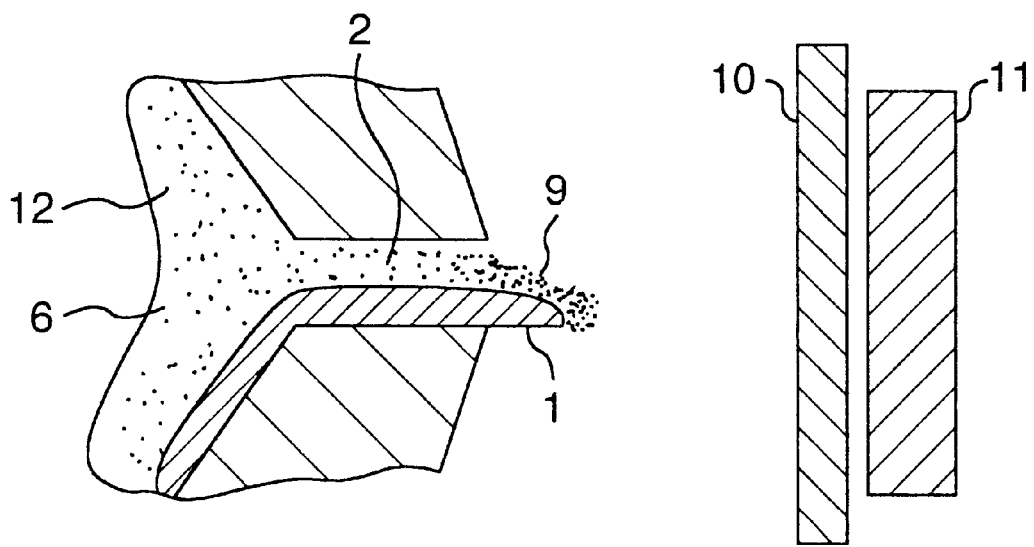
FIG. 5 is a schematic view which shows a subsequent ink discharging motion by the electrostatic ink jet head shown in FIG. 1 after the motion in FIG. 4.
Figure 6:
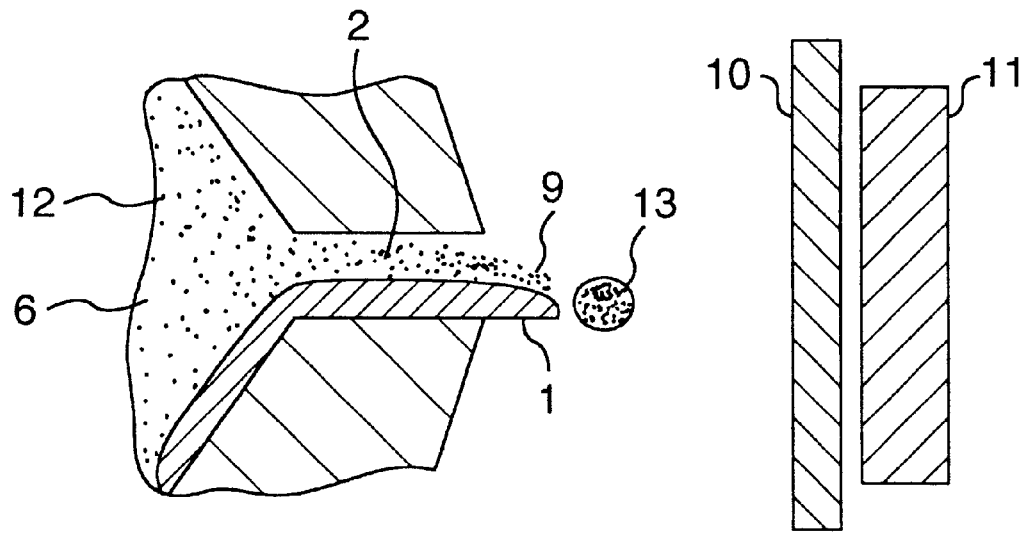
FIG. 6 is a schematic view which shows a subsequent ink discharging motion by the electrostatic ink jet head shown in FIG. 1 after the motion in FIG. 5.
Figure 7:
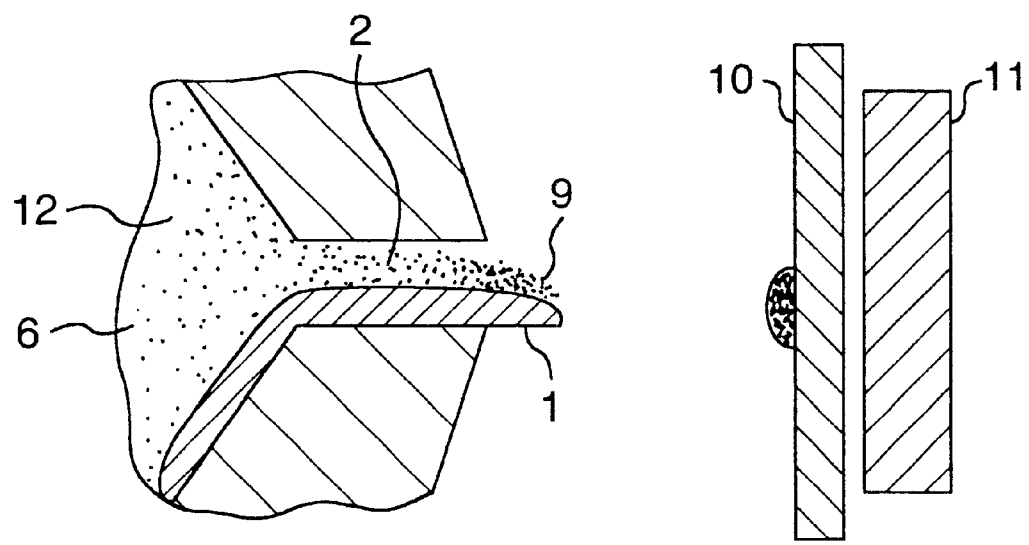
FIG. 7 is a schematic view which shows a subsequent ink discharging motion by the electrostatic ink jet head shown in FIG. 1 after the motion in FIG. 6.

In order to perform a high density printing even at a high printing frequency, the inventors of the present invention pays attention to a material of an ink. Then, an ink in which a printing frequency is high and a high density printing can be performed is realized by particularly defining a proper range of an ink material value which gives an influence to a high density printing and a high printing frequency.

For example, the ink material value which acts on the printing frequency is as follows.

That is, a discharge motion of the electrostatic type ink jet head can be explained by three stages of motions which are explained in the conventional art.

A first stage corresponds to a stage of supplying the color material particle to the front end of the printing electrode due to an electrophoresis. In order to increase the printing frequency at this stage, it is necessary to make a speed of the electrophoresis high so as to supply the color material particle near the printing electrode at a high speed. Accordingly, the ink material value which is important at this stage corresponds to a material value which is determined in accordance with the speed of the electrophoresis of the color material particle.

A second stage corresponds to a stage that the color material particular forms the meniscus formed in an ink drop shape at the front end of the printing electrode. In this stage, since a density of the ink near the meniscus is substantially constant, a speed of forming the meniscus is determined in accordance with a viscosity of the ink. Accordingly, the viscosity is a most important parameter.

A third stage corresponds to a stage of discharging the ink as the ink drop after forming the meniscus. In this stage, since the greater the force directing toward the opposing electrode is, the greater the surface potential of the ink drop is, the discharging speed becomes also high. Accordingly, the magnitude of the $\zeta$ electric potential of the color material particle is a most important parameter.

As mentioned above, with respect to the ink material value, in particular, the ratio between the $\zeta$ electric potential applied to the printing frequency and the viscosity, the $\zeta$ electric potential and the viscosity are defined by a proper range. Further, the volume resistivity, the average diameter of the color material particular and the ratio between the $\zeta$ electric potential and the viscosity are defined by a proper range. In this case, a description of the ink material value applied to the high density printing is omitted here and will be given later.

That is, the invention stated in claim 1 of the present invention is the ink used for the electrostatic type ink jet head, has the insulative solvent having the volume resistivity of at least $10^{10}$ $\Omega$cm, the chargeable color material particle and the electric charge controlling agent having the function of charging the color material particle to a predetermined polarity as main components, and is structured such as to be adjusted to have the following material values.

That is, the volume resistivity of the ink is within the range between $10^9$ and $10^{12}$ $\Omega$cm (hereinafter, this is referred to as "a material value A"). Further, the average diameter of the color material particle is within the range between 0.1 and 2 $\mu$m (hereinafter, this is referred to as "a material value B"). Further, the ratio ($\zeta$ electric potential/viscosity) between the $\zeta$ electric potential and the viscosity of the color material particular is within the range between 10 and 100 (mV/cp) (hereinafter, this is referred to as "a material value C"). Further, the viscosity of the ink is within the range between 2 and 20 cp (hereinafter, this is referred to "a material value D"). Further, the absolute value of the $\zeta$ electric potential of the color material particle is within the range between 30 mV and 200 mV (hereinafter, this is referred to as "a material value E").

Accordingly, there can be obtained an effect that a high quality image can be stably obtained by a high density printing even at a high printing frequency.

Hereinafter, a description will be given of each of the material values of the ink mentioned above.

At fist, a description will be given of the material value A.

In the first place, in order to perform the high density printing, it is preferable that the volume resistivity of the ink is high.

That is, in the case of using the ink having the volume resistivity less than $10^9$ $\Omega$cm, an electric charge is poured into the ink which is in contact with the printing electrode due to a high voltage applied to the printing electrode, whereby the ink near the printing electrode is charged with the electric charge. As a result, the solvent in the ink is charged with the electric charge at the same time when the color material particle is cohered near the printing electrode due to the electrophoresis, whereby the solvent is discharged together with the color material particle, so that a bleeding is generated on the printing medium and the high density printing can not be realized.

However, in the case of using the ink having a volume resistivity between $10^9$ and $10^{12}$ $\Omega$cm, it is possible to delay a time for which the ink disposed near the printing electrode is charged even when an electric charge is applied to the ink disposed near the printing electrode due to a high voltage applied to the printing electrode. As a result, since the color material particles is cohered near the printing electrode due to the electrophoresis and a lot of color material particles are discharged, it is possible to secure the high density printing.

Further, in the case of the ink having a volume resistivity over $10^{12}$ $\Omega$cm, a time for charting the electric charge to the solvent becomes significantly late. As a result, since the solvent is significantly hard to be discharged and only the color material particles are discharged, a diameter of the printing dot becomes significantly small and the case is not actually preferable.

Accordingly, it is possible to perform the high density printing by selecting the volume resistivity of the ink within a range between $10^9$ and $10^{12}$ $\Omega$cm.

Next, a description will be given of the material value B.

In the case that the color material particles perform an electrophoresis, the solvent disposed near the color material particles flows together with the color material particles. Then, since a specific surface area is increased in the case that the average diameter of the color material particles is small in comparison with the case that the average diameter of the particles is large, an amount of the solvent which flows together with the color material particles is increased. In particular, in the color material particulars having the average diameter smaller than 0.1 $\mu$m, there is seen a significant reduction of a cohesion efficiency. That is, in the ink constituted by the color material having the average diameter smaller than 0.1 $\mu$m, the solvent and the color material particles can not be sufficiently separated at a time of discharging the ink drop, so that the color material particles which reach the printing medium contain a lot of solvent. Accordingly, it is impossible to realize the high density printing and a low quality image with the bleeding is obtained.

Further, in the case of the color material particles having the average diameter equal to or more than 2 $\mu$m, since a dispersing property is reduced and the particles sink for a significantly short time, it is hard to apply the case to the printing apparatus. Further, a fixing property to the printing medium is also deteriorated.

Accordingly, the high density printing can be performed by selecting the average diameter of the color material particles within a range between 0.1 and 2 $\mu$m.

Next, a description will be given of the material value C.

A migration velocity v of the color material particles can be expressed by a relation v $\epsilon\zeta$E/$\eta$. Here, $\epsilon$ is a dielectric constant of an insulative solvent used for the ink. Further, $\zeta$ is an electric potential of the color material particular with respect to the insulative solvent. E is a magnitude of an electric field within the ink tank. $\eta$ is a viscosity of the insulative solvent used for the ink.

As is apparent from the formula, a magnitude of the migration velocity of the color material particle is dependent upon an absolute value of a ratio between the ζ electric potential and the viscosity which correspond to the material values of the ink, that is, a value of |ζ/η|. Then, when the absolute value of the ratio between the ζ electric potential and the viscosity becomes less than 10 (mV/cp), the reduction of the printing frequency becomes significant. Accordingly, the larger the absolute value of the ratio between the ζ electric potential and the viscosity is, the larger the cohesion efficiency and the supplying velocity of the color material particle to the front end of the printing electrode become, so that it is possible to stably perform the high density printing and it is also possible to increase the printing frequency.

However, in the case that the absolute value of the ratio between the ζ electric potential and the viscosity becomes significantly large, the solvent of the ink is charged in a negative potential when the color material particular is charged in a positive potential, so that the electrophoresis of the solvent along the wall surface of the ink tank, that is, an electroosmotic current can not be ignored. When the absolute value of the ratio between the ζ electric potential and the viscosity is over 100 (mV/cp), a circulating convection of the solvent is generated within the ink tank due to the electroosmotic current, thereby causing a disturbance of the electrophoresis of the color material. In this case, the color material particles flow in the same manner as the circulating convection, so that the cohesion property of the color material particles to the front end of the printing electrode is deteriorated. As a result, it is impossible to realize the high density printing and the high printing frequency.

Accordingly, since it is possible to increase the velocity of electrophoresis of the color material and increase the cohesion efficiency and the cohesion velocity by selecting the absolute value of the ratio between the ζ electric potential and the viscosity of the color material particle within the range between 10 and 100 (mV/cp), it is possible to perform the high density printing and increase the printing frequency.

Next, a description will be given of the material value D.

Since a dielectric solvent having a low polarity is employed for the solvent of the ink, the viscosity becomes small in the case that a molecular weight is small, and a binding force between the solvent molecules is also small. Accordingly, in the case that the viscosity of the ink is less than 2 cp, there occurs a phenomenon that a volatility of the solvent becomes high. The solvent having a high volatility makes a drying velocity of the ink fast. Then, in an actual use, the color material particles are attached to the printing electrode due to the drying, so that the ink drop is not discharged and the meniscus is unstably formed, whereby there is a case that the printing quality is lowered.

Further, in the case that the viscosity is large, a lot of time is required for forming the meniscus at the front end of the printing electrode when discharging the ink drop. As a result, since it is necessary to increase a time for applying the printing voltage, it is impossible to make the printing frequency high.

Accordingly, the printing with the high printing frequency can be performed without generating the problem with respect to the drying by suitably selecting the viscosity of the ink within the range between 2 and 20 cp.

Finally, a description will be given of the material value E.

In the case that the absolute value of the ζ electric potential is less than 30 mV, since a surface electric potential of the ink meniscus cohered on the front end of the printing electrode is low, a diameter of a flying dot becomes large when the ink drop is discharged. As a result, a diameter of the printing dot is increased and it is hard to increase the resolution. Further, in the case that the ζ electric potential is small as mentioned above, since a dispersion of the ζ electric potential between the color material particles is large and the color material particles charged in the negative electric potential may exist, the color material particles may be electrically attached to the printing electrode. Then, a shape of the meniscus at the front end of the printing electrode becomes unstable, thereby deteriorating a stability of discharging.

Further, when the absolute value of the ζ electric potential becomes high over 200 mV, the ink drop is discharged by the small meniscus. As a result, the diameter of the printing dot becomes significantly small and is not preferable in the actual use. Further, when the ζ electric potential is over 200 mV, a electric charging stability is poor and a change with the passage of time is large. Accordingly, it is impossible to maintain a fixed ζ electric potential for a long time, and it is technically hard to actualize.

Accordingly, it is possible to increase the printing frequency by suitably selecting the absolute value of the ζ electric potential of the color material particle within the range between 30 mV and 200 mV.

Hereinafter, a description will be given of materials for constituting the ink, a producing method and a ratio of arranging the constituting materials in accordance with the present embodiment.

The insulative solvent in accordance with the present embodiment is required to have a low dielectric constant and a high insulating property, and as required properties, at first, there can be exemplified a volume resistivity of at least $10^{10}$ Ωcm or more so as to prevent the volume resistivity of the ink from becoming less than $10^9$ Ωcm after mixing the color material, the resin, the electric charge controlling agent and the like. Further, a dielectric constant less than 3.0 is preferable. As the other required properties, there can be exemplified a evaporating velocity within a suitable range at a room temperature so as to make an evaporation of the insulative solvent at the ink discharge port as small as possible and quickly dry and fix the ink after the printing, a flashing point equal to or more than at least the room temperature so as to prevent flashing, and further a high safety against the environment and the human body.

A hydrocarbon solvent, a silicone oil or the like which is employed for the insulative solvent in accordance with the present embodiment is sufficient to satisfy the requirements mentioned above and is not particularly limited, however, the following particular examples will be listed up as specifically preferable ones.

As the hydrocarbon solvent, there can be exemplified an isoparafine hydrocarbon having a boiling point within a range between 150 and 350° C. and a high purity, and as products on market, there are ISOPER G, L, M, V (product name) and NORPER 12, 13, 15 (product name) manufactured by Exon Chemical, IP SOLVENT 1620, 2028 (product name) manufactured by Idemitsu Petrochemistry, ISOZOR 300, 400 (product name) manufactured by Nihon Petrochemistry and the like. These products correspond to an aliphatic saturated hydrocarbon having a significantly high purity and is structured such that a flushing point is equal to or more than 40° C., a viscosity at 25° C. is less than 3 cp, a surface tension at 25°C. is between 22.5 and 28.0 mN/m, and a volume resistivity at 25° C. is equal to or more than $10^{15}$ Ωcm. Further, there are characteristics that a reactivity is low and stable, a virulence is low and a safety is high, and an offensive smell is little.

As the silicone oil, there can be exemplified a synthetic dimethyl polysiloxane having a low viscosity, and as the product on the market, there can be exemplified KF96L (product name) manufactured by Shinetsu Silicone, SH200 (product name) manufactured by Toray Dow Corning Silicone, and the like. These dimethyl polysiloxane is characterized in that the surface tension is lower in comparison with the isoparafine hydrocarbon, and has a surface tension between 18 and 21 mN/m.

As the color material particle in accordance with the present embodiment, it is possible to employ a single body of the color material or a structure that the color material is dispersed into the resin which is insoluble to the solvent. As the color material, it is possible to employ various kinds of inorganic and organic color materials, for example, there are a carbon black, a β-naphthol azo color material, a pyrazolone azo color material, an acetoacetic allylic azo color material, a condensed azo color material, a cis azo color material, an anthrapyridine color material, an indanthrene color material, a phthalocyanine color material, a quinacridone color material, an indigo color material, an isoindolinon color material, a dioxazine color material, a perylene color material, a phthaloperinon color material, a quinophthalone color material, a titanium dioxide and the like. Further, as the resin insoluble to the solvent, it is possible to employ various kinds of known natural or synthetic resins, for example, there are an acrylic resin, an epoxy resin, an ethylene-vinyl acetate resin, a vinyl chloride-vinyl acetate resin, a styrene-butadiene resin and the like. As the method of dispersing the color material to the resin, it is possible to employ various kinds of known methods as seen in a dry or wet type color material manufacturing process in an electrophotography. Further, since a work color material obtained by dispersing fine particles of the color material to a rosin ester resin, a vinyl chloride-vinyl acetate resin or the like is sold on the market, these may be employed.

To the resin in accordance with the present embodiment, improving a dispersing property of the color material, that is, a function as the dispersing agent, and improving a fixing property of the color material to the printing medium, that is, a function as the binder can be added as main objects.

Accordingly, the resin is required to be soluble to the solvent at an amount equal to or more than a fixed amount, preferably to have a high affinity with the color material with taking an effect as the solvent into consideration, and preferably to be a solid by the resin itself at the room temperature or to be a solvent having a very high viscosity with taking an effect as the binder into consideration.

The kind of the resin is not particularly limited as far as the above requirements are satisfied, however, there are significantly small kinds of resins which has a sufficient soluble property to the insulative solvent mentioned above and satisfies the properties mentioned above. As a result of considering these points, it has been found that the hydrocarbon resin has an excellent property. As a particular example of the product on the market, there is an ALCON (product name) corresponding to a saturated cycloparaffin manufactured by Arakawa Chemical Industry. Further, with respect to the resin, as a result of considering an adding effect of the color material with respect to the ζ electric potential together with the electric charge controlling agent mentioned below, it has been estimated that it has a relation to the electric charge of the color material.

As the electric charge controlling agent in accordance with the present embodiment, it is possible to employ a metallic soap of a naphthenic acid, an octyl acid, a stearic acid and the like, a metallic salt of an alkyl sulfuric acid, a metallic acid of an alkyl phosphoric acid, a fatty acid, a lecithin and the like, however, in particular, in the case of charging the color material to the positive polarity, since the solubility to the solvent is good and the electric charging performance is excellent, the metallic soap of the naphthenic acid and the octyl acid are specifically preferable. As a metallic atom of these metallic soap, a manganese, a lead, a zinc, a calcium, an aluminum, a zirconium, a copper, an iron and the like can be employed. However, since an electric charging mechanism of the color material particle has not been cleared yet, and it is possible to electrically charge the color material without using the electric charge controlling agent mentioned above, the electric charge controlling agent is sufficient to have the function of electrically charging the color material particle, and the kind of the material is not always limited.

Further, the electric charge controlling agent mentioned above serves a function of improving the dispersion stability of the color material by electrically charging the color material.

The basic constituting materials in the present embodiment are as mentioned above, however, an additive agent such as a dispersing agent, a surface active agent, a wax, a dye or the like may be added.

Next, a description will be given of the method of manufacturing the ink and the mixing ratio of the constituting materials.

For manufacturing the ink, it is possible to employ a general method which is known as a method of manufacturing various kinds of pigment inks and a solvent developing agent in an electrophotography. For example, there is a method of manufacturing the ink by diluting a mixture obtained by mixing the color material, the resin, the electric charge controlling agent and the other assisting additive agent weighed to be a predetermined mixing ratio to the solvent so as to become within a proper range of viscosity, to a predetermined density at a time of using by a dispersion medium after manufacturing an aggregate liquid of the ink to which the color material of about some hundreds nm to some pm is dispersed, by mixing and crushing the mixture for about some hours to some tens hours with using a dispersing machine such as a beads mill, an atriter, a sand mill, a ball mill or the like. Further, there is a method of adding the electric charge controlling agent after mixing, crushing and diluting only the color material, the resin and the assisting additive agent in the same manner.

The density of the color material in the ink in accordance with the present embodiment is preferably within a range between 0.5 and 10 weight % with respect to a total amount of the ink. That is, when the density of the color material is less than 0.5 weight %, a sufficient printing density can not be obtained and it is not preferable. Further, when it becomes more than 10 weight %, the viscosity of the ink significantly increases and it tends that a stable ink discharge can not be performed, so that it is not preferable.

The density of the resin in the ink in accordance with the present embodiment is preferably within a range between 0.1 and 20 weight %. That is, when the density of the resin becomes less than 0.1 weight %, there is hardly obtained the effect of improving the dispersion property of the color material and applying the sufficient ζ electric potential to the color material, and when it is more than 20 weight %, the viscosity of the ink significantly increases and it tends that a stable ink discharge can not be performed, so that both are not preferable.

The density of the electric charge controlling agent in accordance with the present embodiment is preferably within a range between 0.05 and 2.0 weight % with respect to the total amount of the ink. That is, when the density of the electric charge controlling agent is less than 0.05 weight %, there is hardly obtained the effect of improving the dispersion property of the color material and applying the high $\zeta$ electric potential to the color material, and when it is more than 2.0 weight %, the volume resistivity of the ink is significantly reduced and it tends that the printing density is lowered, so that both are not preferable.

In particular, when setting the $\zeta$ electric potential of the color material to a level equal to or more than 30 mV by selecting the material including the color material and the resin and optimizing the mixing ratio, the electrophoresis property of the color material is improved, whereby the rate of the color material in the ink drop becomes sufficiently high, so that it is possible to perform the high density printing and it is possible to prevent the color material from being electrically attached onto the printing electrode.

EMBODIMENT

An ink is manufactured on the basis of the constituting materials of the ink, the manufacturing method and the mixing ratio of the constituting materials mentioned above. Further, in order to compare, an ink having a material value out of the ink material value range of the present embodiment mentioned above is simultaneously manufactured. Then, the manufactured inks are estimated by using a conventional electrostatic type ink jet head.

Figure 8:
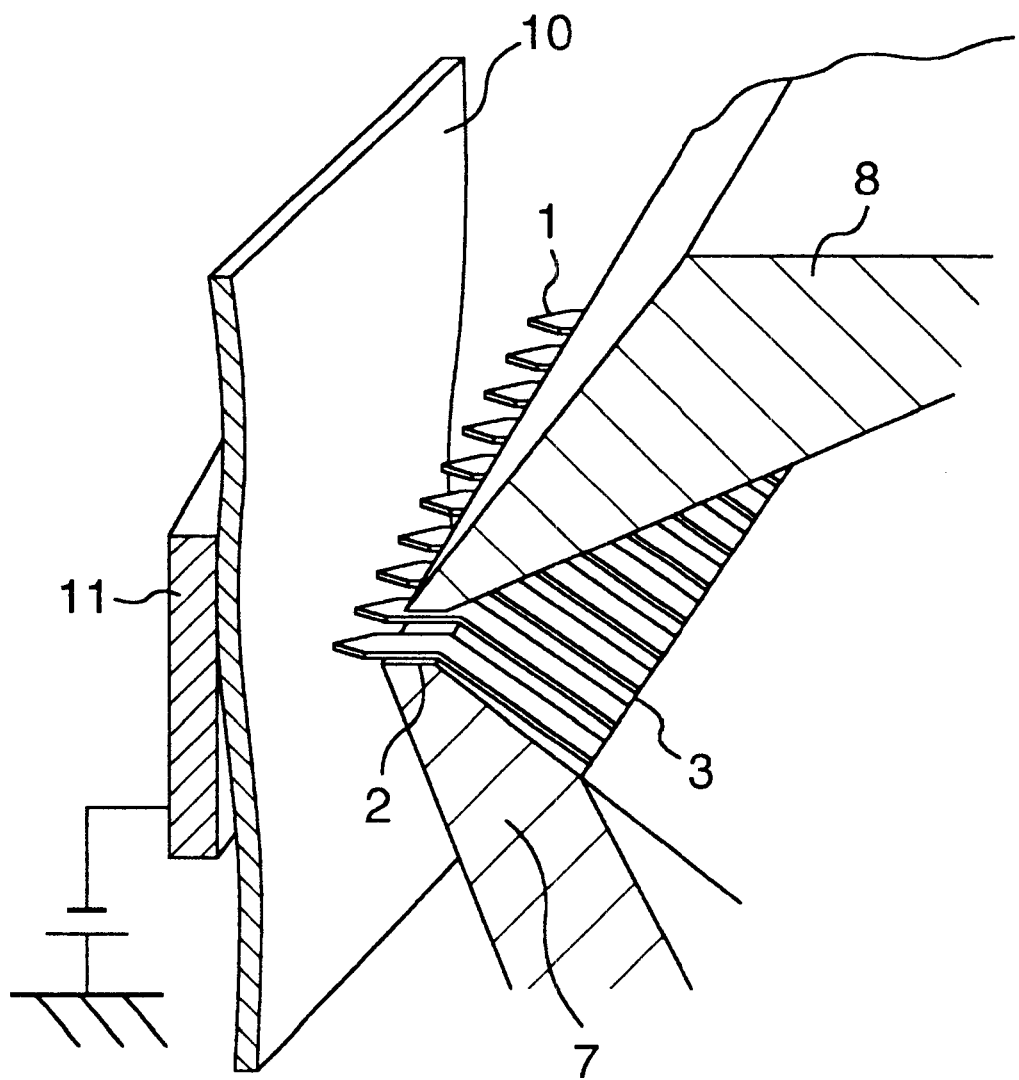
FIG. 8 is a schematic view which shows a structure of an electrostatic type ink jet head which is employed for estimating an ink in accordance with the present embodiment.

Here, FIG. 8 is a perspective view which shows a structure of the electrostatic type ink jet head used for estimating the ink in accordance with the present embodiment. In FIG. 8, the same reference numerals as those in FIGS. 1 to 7 denote the same elements as those of the electrostatic type ink jet head described with respect to FIGS. 1 to 7 and have the same function. In this case, a description of the elements having the same reference numerals as those of the electrostatic type ink jet head in FIGS. 1 to 7 is omitted. In this case, in FIG. 8, the ink and the migration electrode are not illustrated.

The electrostatic type ink jet head in accordance with the present invention is structured such that a width of the slit hole 2 is 300 $\mu$m, a width of the printing electrode 1 is 80 $\mu$m, an arranging interval of the printing electrodes 1 is about 170 $\mu$m corresponding to 150 dpi and an interval between the front end of the printing electrode 1 and the printing paper 10 is 0.7 mm. In the electrostatic type ink jet head having the structure mentioned above, an estimation is performed by using the ink in which the color material particle has a positive electric potential or 0 $\zeta$ electric potential. Further, a fixed minus voltage (−1.2 kV) is always applied to the opposing electrode 11 so as to form a fixed bias electric field between the opposing electrode 11 and the printing electrode 1.

Then, by applying a plus voltage pulse (+600 V) corresponding to the printing signal to the printing electrode 1 at a fixed frequency while moving the printing paper 10 in a direction perpendicular to the longitudinal direction of the electrostatic type ink jet head, the ink drop is discharged from the front end of the printing electrode 1 toward the opposing electrode 11 due to the electrostatic force so as to form a printing dot on the printing paper 10 at a fixed period.

In this case, the voltage of 1000 V which is greater than the signal voltage value is applied to the migration electrode.

The printing estimation of the ink in accordance with the present embodiment is performed by using the electrostatic type ink jet head mentioned above. In this case, the printing estimation is performed by measuring the printing density and the printing frequency.

The printing density is estimated by comparing with the printing density of the printing material by the marketed ink jet printer.

A printing condition is set such that the printing frequency is 500 Hz and the time of applying the printing signal is 500 $\mu$second. An ordinary paper is used as the printing medium, a rush printing is applied within a 1 cm square on the ordinary paper and an estimation of the printing density is performed by a feeling estimation. As a result, in the case that the printing density of the printing material in accordance with the present embodiment is apparently higher than the marketed product, a symbol ◯ is given. Further, in the case that the printing density is not greatly different by the feeling estimation, a symbol X is given. In this case, an optical density of the printing material to which the symbol ◯ is given is equal to or more than 1.4.

Hereinafter, a description will be given of the reason why the estimation of the printing density is performed at 500 Hz.

When the color material particles in the ink are sufficiently cohered and discharged near the printing electrode and the printing is performed in this state, it is principally apparent that the printing density is high. Then, in order to estimate with paying attention to the printing density, it is necessary to consider that there is a case that it comparatively takes long time for the color material particles to cohere near the printing electrode due to the electrophoresis. Accordingly, a comparatively low frequency and a long printing signal applying time are preferable for the printing condition. As mentioned above, in the present embodiment, the printing frequency is set to 500 Hz and the printing signal applying time is set to 500 $\mu$second.

The estimation of the printing frequency is performed at 2 kHz and the printing signal applying time is set to 200 $\mu$second. At this time, in the case that a dot error is less than 0.05% as is the same as that of the marketed ink jet printer, it is judged that the printing at this printing frequency is performed.

Further, in the case that the ink discharge in accordance with the present embodiment is performed at 2 kHz, the symbol ◯ is given. Further, in the case that it is not performed at 2 kHz, the symbol X is given.

Hereinafter, a description will be given of the reason why the estimation of the printing frequency is performed at 2 kHz.

In the case of using the ink having the volume resistivity less than $10^8$ $\Omega$cm, a discharging state of the ink is formed in a towed yarn. The discharge like the towed yarn corresponds to the discharge state generated by the whole of the ink including the ink solvent being electrically charged in accordance with the pouring of the electric charge. The electrically charging velocity by pouring the electric charge is apparently faster than the migration velocity of the color material particle. Accordingly, since the ink discharge start velocity is faster in the discharge like the towed yarn than in the discharge like the drop like, it is known that the printing frequency is high. Further, the printing frequency is not determined only by the ink, but is also depend upon the shape of the head. Accordingly, by comparing the printing frequency at a time of discharging by the electrostatic type ink jet head in accordance with the present embodiment with using the ink having the volume resistivity less than $10^8$ Ωcm, the printing frequency of the ink in accordance with the present embodiment is estimated.

In this case, when using the marketed ink having the volume resistivity less than $10^8$ Ωcm and setting the printing signal applying time to 200 μsecond, the maximum printing frequency in the electrostatic type ink jet head in accordance with the present embodiment is 2 kHz. Accordingly, in the present embodiment, the estimation is performed at the printing frequency of 2 kHz.

Further, various kinds of material values which are important for the present invention are measured by the following measuring instrument and method.

The ζ electric potential of the color material particle is measured by using ELS-6000 type manufactured by Ohtsuka Electronic Co., Ltd. Further, the ink used for the measurement is diluted to 1000 times by the solvent. The viscosity of the ink is measured by using RB-80L type manufactured by Tohki Industry. The volume resistivity of the ink is measured by using 6517 type high resistance gauge manufactured by Keyslay (Toyo Tecnica) and 1 type solvent electric resistance measuring electrode manufactured by Toyo Vacuum Industry. In this case, the temperature at a time of measuring the viscosity of the ink and the volume resistivity is 25° C. The average diameter of the color material particles is measured by a grain size dispersing gauge LA-700 type manufactured by Horiba Manufacturing.

Next, a description will be given of particular contents of the present embodiment.

(Embodiment 1)

A transparent mixed solution is obtained by adding a hydrocarbon resin to an OSOPER (product name) corresponding to an isoparaffin hydro carbon manufactured by Exon Chemical and mixing and stirring at a room temperature until the hydro carbon is completely dissolved. A color material dispersion ink having a color material density of 3 weight % is manufactured by inserting the mixed solution and MICROLITH Black C-T (product name) corresponding to a carbon black color material manufactured by Chiba Speciality Chemicals together with beads made of a zirconia into a crushing container made of an agate and mixing by a planetary type ball mill apparatus.

The control of the ζ electric potential and the volume resistivity is performed by adjusting an amount of addition of an octyl acid zirconium corresponding to the electric charge controlling agent and selecting the kind of the hydro carbon solvent. In this case, the control of the viscosity is performed by adjusting the kind of the hydro carbon solvent and the amount of addition of the resin. Further, the control of the diameter of the color material is performed by adjusting the mixing time in the ball mill apparatus.

Thirty kinds of inks are manufactured so as to have the following material values.

| | |
|---|---|
| VOLUME RESISTIVITY | $10^8$–$10^{13}$ Ωcm |
| AVERAGE DIAMETER OF COLOR MATERIAL | 0.05–5 μm |
| RATIO BETWEEN ζ ELECTRIC POTENTIAL AND VISCOSITY | 0–250 (mV/cp) |
| VISCCSITY | 1–30 cp |
| ζ ELECTRIC POTENTIAL | 0–400 mV |

For example, the ink having the constituting material mentioned above and the material values thereof will shown below.

| | |
|---|---|
| CONSTITUTING MATERIAL OF INK | |
| HYDRO CARBON SOLVENT (ISOPER G) | 93 WEIGHT % |
| MICROLITH Black C-T | 3 WEIGHT % |
| HYDRO CARBON RESIN | 3 WEIGHT % |
| OCTYL ACID ZIRCONIUM | 1 WEIGHT % |
| MIXING TIME | 6 HOURS |
| MATERIAL VALUES OF INK | |
| VOLUME RESISTIVITY | $2 \times 10^{10}$ Ωcm |
| AVERAGE DIAMETER OF COLOR MATERIAL | 0.9 μm |
| RATIO BETWEEN ζ ELECTRIC POTENTIAL AND VISCOSITY | 32 (mV/cp) |
| VISCOSITY | 2.5 cp |
| ζ ELECTRIC POTENTIAL | 70 mV |

Then, a relation between a result of estimation of the printing density of the embodiment 1 and the ink material value is as follows.

The volume resistivity of the ink and the result of the printing density are shown in Table 1.

TABLE 1

VOLUME RESISTIVITY (Ωcm)

PRINTING DENSITY

LESS THAN 109

In Table 1, the relation between the volume resistivity of the ink and the printing density is classified into three sections. One of them is a case that the volume resistivity of the ink is less than $10^9$ Ωcm. Further, the other two of them are cases that the volume resistivity of the ink is between $10^9$ and $10^{12}$ Ωcm and over $10^{12}$ Ωcm.

In the case that the volume resistivity of the ink is less than $10^9$ Ωcm, the discharging state of the ink is the mixed state between the discharge like the towed yarn and the discharge like the drop or the discharge state like the towed yarn. Then, the printing in the drop like discharge state has a low printing density. Further, in the towed yarn like discharge state, the printing density becomes lower. As a result, an unevenness of the density is generated in the printing. Accordingly, in the ink having the volume resistivity less than $10^9$ Ωcm, the printing density is low and is not stable.

In the case that the volume resistivity of the ink is over $10^{12}$ Ωcm, the discharge state of the ink is the discharge like the drop, however, the printing density is low. That is, the printing dot itself has a high density, however, the diameter of the dot is significantly small and the rush printing can not be performed, so that the printing density becomes low. Further, in the case that the volume resistivity of the ink is between $10^9$ and $10^{12}$ Ωcm, the printing density is different in accordance with the kind of the ink.

Next, the relation between the average diameter of the color material particles and the printing density is searched in the ink having the volume resistivity between $10^9$ and $10^{12}$ Ωcm.

The result between the average diameter of the color material particles of the ink and the printing density will be shown in Table 2.

TABLE 2

AVERAGE DIAMETER (μm)

PRINTING DENSITY

LESS THAN 0.1

In Table 2, the relation between the average diameter of the color material particles and the printing density is classified into three sections. One of them is a case that the average diameter is less than 0.1 μm, one of them is a case that the average diameter of the color material particles of the ink is over 2 µm, and the remainder is a case that the average diameter of the color material particles of the ink is between 0.1 and 2 •m.

When the average diameter of the color material particles of the ink becomes small, the specific surface area of the color material particles is increased, so that the solvent near the color material particles much flow in the following manner at the same time when the color material particles perform an electrophoresis. Then, in the case that the average diameter of the color material particles of the ink is less than 0.1 µm, the color material particles are not actually cohered. As a result, the cohesion property of the color material particles is insufficient, and the image having a low printing density and a bleeding is obtained.

Further, in the case that the average diameter of the color material particles of the ink is equal to or more than 2 µm, the color material particles quickly sink during the printing time, so that the color material particles are insufficiently supplied to the front end of the electrode and the printing density is significantly lowered during the printing.

As mentioned above, in the case that the average diameter of the color material particles is less than 0.1 µm or over 2 µm even when the volume resistivity of the ink is between $10^9$ and $10^{12}$ Ωcm, the high density printing can not be realized. Further, in the case of the ink in which the volume resistivity is between $10^9$ and $10^{12}$ Ωcm and the average diameter of the color material particles is between 0.1 and 2 µm, there is obtained the result that the printing density is different in accordance with the kind of the ink.

Next, with respect to the case of the ink in which the volume resistivity is between $10^9$ and $10^{12}$ Ωcm and the average diameter of the color material particles is between 0.1 and 2 µm, the relation between the ratio between the ζ electric potential and the viscosity of the color material particles and the printing density will be searched.

The results of the ratio between the ζ electric potential and the viscosity of the color material particles and the printing density are shown in Table 3.

TABLE 3
RATIO BETWEEN ζ ELECTRIC POTENTIAL AND VISCOSITY (mV/cp)
PRINTING DENSITY
LESS THAN 5

In Table 3, the result of the printing density is classified into three. That is, they are a case that the ratio between the ζ electric potential and the viscosity of the color material particles is less than 5 (mV/cp), a case that it is over 200 (mV/cp) and a case that the ratio between the ζ electric potential and the viscosity of the color material particles is between 5 and 200 (mV/cp).

When the ratio between the ζ electric potential and the viscosity is less than 5 (mV/cp), the velocity of electrophoresis of the color material particles is small, so that the ink is discharged without the color material particles being sufficiently supplied near the printing electrode. As a result, it is impossible to realize the high density printing.

Further, when the ratio between the ζ electric potential and the viscosity is over 200 (mV/cp), the velocity of electrophoresis of the color material particles is large and the color material particles are sufficiently supplied near the printing electrode immediately after the electrophoresis is started, however, thereafter the circulating convection is generated within the ink tank, and the ink is discharged without the color material particles being sufficiently supplied. As a result, it is impossible to realize the high density printing even in the case that the ratio between the ζ electric potential and the viscosity of the color material particles is over 200 (mV/cp).

In this case, when the ratio between the ζ electric potential and the viscosity is between 5 and 200 (mV/cp), the velocity of the electrophoresis is gradually increased and the velocity of the circulating convection is low, thereby not affecting the printing density, so that the high density printing can be realized in all the inks.

Accordingly, it is known that the material values of the ink which are necessary for realizing the high density printing are the volume resistivity of the ink between $10^9$ and $10^{12}$ Ωcm, the average diameter of the color material particles between 0.1 and 2 µm, and the ratio between the ζ electric potential and the viscosity between 5 and 200 (mV/cp).

Further, the printing frequency of the ink having the material values necessary for the high density printing is searched.

In this case, at first, the relation between the ratio between the ζ electric potential and the viscosity of the color material particles and the printing frequency is searched.

A Result of the ratio between the ζ electric potential and the viscosity of the color material particles and the printing frequency are shown in Table 4.

TABLE 4
RATIO BETWEEN ζ ELECTRIC POTENTIAL AND VISCOSITY (mV/cp)
PRINTING FREQUENCY
LESS THAN 10

In Table 4, the result of the ratio between the ζ electric potential and the viscosity of the color material particles and the printing frequency is widely classified into three sections. That is, they are a case that the ratio between the ζ electric potential and the viscosity of the color material particles is less than 10 (mV/cp), a case that it is over 100 (mV/cp), and a case that the ratio between the ζ electric potential and the viscosity of the color material particles is between 10 and 100 (mV/cp).

In the case that the ratio between the ζ electric potential and the viscosity of the color material particles is less than 10 (mV/cp), the color material particles are not sufficiently supplied due to the electrophoresis when the printing frequency becomes 2 kHz, so that there are cases that the discharge is performed as the liquid drop with containing a lot of solvent and that the dot error is generated, in a mixed manner.

Further, when the ratio between the ζ electric potential and the viscosity is equal to or more than 100 (mV/cp), the velocity of electrophoresis is large and the color material particles are sufficiently supplied to the front end of the printing electrode immediately after the electrophoresis is started, however, thereafter, the ink is discharged without the color material particles being sufficiently supplied due to the stirring of the color material particles within the ink tank caused by the convection. As a result, the same phenomenon as that of the case that the ratio between the ζ electric potential and the viscosity is less than 10 (mV/cp).

Then, in the case that the ratio between the ζ electric potential and the viscosity is between 10 and 100 (mV/cp), there are the ink in which a good printing can be performed with no dot error and the ink in which the dot error is generated, in a mixed manner.

Next, the viscosity and the printing frequency of the ink in which the ratio between the ζ electric potential and the viscosity is between 10 and 100 (mV/cp) is searched.

The viscosity of the ink and the result of the printing frequency are shown in Table 5.

TABLE 5
VISCOSITY (cp)
PRINTING FREQUENCY
LESS THAN 2

In Table 5, the result of the printing frequency is widely classified into three sections. That is, one of them is a case that the viscosity of the ink is less than 2, one of them is a case that it is over 20, and the remainder is a case that the viscosity of the ink is between 2 and 20.

When the viscosity of the ink is less than 2 cp, the velocity of drying of the solvent in the ink is significantly large, the front end of the printing electrode is dried during the printing and the ink is not supplied, so that there is a case that the printing itself is not performed. When the viscosity of the ink is over 20 cp, a velocity of displacement of the meniscus in the front end of the printing electrode becomes small, so that the meniscus slowly grows for the signal voltage applying time of 200 $\mu$second. As a result, it is impossible to separate and discharge the ink drop from the meniscus due to the electrostatic force.

Further, when the viscosity of the ink is between 2 and 20 cp, the ink is not dried during the printing, the velocity of forming the meniscus is large and the ink can be discharged within 200 $\mu$second, so that it is possible to perform the printing with a high printing frequency.

Next, the $\zeta$ electric potential and the printing frequency of the ink in which the ratio between the $\zeta$ electric potential and the viscosity is between 10 and 100 (mV/cp) and the viscosity is between 2 and 20 cp are searched.

The $\zeta$ electric potential of the color material particles and the result of the printing frequency are shown in Table 6.

TABLE 6
$\zeta$ ELECTRIC POTENTIAL (mV)
PRINTING FREQUENCY
LESS THAN 30

In Table 6, the relation between the $\zeta$ electric potential of the color material particles and the printing frequency is classified into three sections. That is, one of them is a case that the $\zeta$ electric potential is less than 30 mV, one of them is a case that the $\zeta$ electric potential is over 200 mV, and the remainder is a case that it is between 30 and 200 mV.

When the $\zeta$ electric potential is less than 30 mV, the electric charge of the color material particles are largely dispersed and the color material particles having an opposite polarity are mixed. As a result, since the color material particles having the opposite polarity perform an electrophoresis in an opposite direction, a gentle convection is generated within the ink tank. Accordingly, since it is hard to supply the color material particles to the front end of the printing electrode, and the color material particles are insufficiently supplied when the printing frequency becomes equal to or more than 2 kHz, there is a case that the ink is not discharged. When the $\zeta$ electric potential becomes high over 200 mV, the ink drop is discharged with the small meniscus. As a result, the diameter of the printing dot becomes significantly small, and it is not preferable in the actual use. Further, there is a case that the ink is discharged without responding to the printing signal, it is hard to control the discharge by the printing signal voltage. Further, the electric charge stability is poor, the change with the passage of time is large, and the printing reproducibility is poor.

Accordingly, it is known that the case that the ratio between the $\zeta$ electric potential and the viscosity is between 10 and 100 (mV/cp), the viscosity of the ink is between 2 and 20 cp and the $\zeta$ electric potential is between 10 and 100 mV is preferable for the material value of the ink which can make the printing frequency high.

As mentioned above, it is confirmed that the high density printing and the high printing frequency can be simultaneously realized if the material values of the ink satisfy the conditions that the volume resistivity of the ink is between $10^9$ and $10^{12}$ $\Omega$cm, the average diameter of the color material particles is within the range between 0.1 and 2 $\mu$m, the ratio between the $\zeta$ electric potential and the viscosity is within the range between 10 and 100 (mV/cp), the viscosity of the ink is within the range between 2 and 20 cp and the $\zeta$ electric potential of the color material particles is within the range between 30 mV and 200 mV.

(Embodiment 2)

Ten kinds of inks are manufactured by the same manufacturing method and by using the same constituting materials as those of the embodiment 1. In this case, five kinds of inks among ten kinds are manufactured so as to satisfy the preferable material values of the embodiment 1, and the other five kinds are manufactured within the non-preferable material values of the embodiment 1.

The results of the printing estimation are the same as those of the embodiment 1, it is reproduced and confirmed that the material values of the ink which can perform the high density printing and make the printing frequency high are the same as the results of the embodiment 1.

(Embodiment 3)

Thirty kinds of inks are manufactured by the same manufacturing method of the ink as that of the embodiment 1.

Here, in the embodiment 3, the ink is manufactured by changing the constituting materials with respect to the embodiments 1 and 2. That is, a transparent mixed solution is obtained by adding a linseed oil denaturation alkyd resin to a NORPER (product name) corresponding to an isoparaffin hydro carbon manufactured by Exon Chemical and mixing and stirring at a room temperature until the linseed oil denaturation alkyd resin is completely dissolved. A color material dispersion ink having a color material density of 3 weight % is manufactured by inserting the mixed solution and MICROLITH Blue C-T (product name) corresponding to a cyanogen color material manufactured by Chiba Speciality Chemicals together with beads made of a zirconia into a crushing container made of an agate and mixing by a planetary type ball mill apparatus. In this case, the material values such as the volume resistivity, the average diameter of the color material and the like are controlled by the same method as that of the embodiment 1.

The inks are manufactured within the following material values.

| | |
|---|---|
| VOLUME RESISTIVITY | $10^8$–$10^{13}$ $\Omega$cm |
| AVERAGE DIAMETER OF COLOR MATERIAL | 0.02–4 $\mu$m |
| RATIO BETWEEN $\zeta$ ELECTRIC POTENTIAL AND VISCOSITY | 0–150 (mV/cp) |
| VISCOSITY | 0.9–25 cp |
| $\zeta$ ELECTRIC POTENTIAL | 0–300 mV |

For example, the ink having the constituting material mentioned above and the material values thereof will shown below.

| CONSTITUTING MATERIAL OF INK | |
|---|---|
| HYDRO CARBON SOLVENT (NORPER 12) | 93 WEIGHT % |
| MICROLITH Blue C-T | 3 WEIGHT % |
| LINSEED OIL DENATURATION ALKYD RESIN | 3 WEIGHT % |

-continued

| | |
|---|---|
| NAPHTHENIC ACID MANGANESE | 1 WEIGHT % |
| MIXING TIME | 3 HOURS |
| MATERIAL VALUES OF INK | |
| VOLUME RESISTIVITY | $5 \times 10^{10}$ Ωcm |
| AVERAGE DIAMETER OF COLOR MATERIAL | 1.5 μm |
| RATIO BETWEEN ζ ELECTRIC POTENTIAL AND VISCOSITY | 30 (mV/cp) |
| VISCOSITY | 3 cp |
| ζ ELECTRIC POTENTIAL | 90 mV |

In this case, twenty kinds of inks among thirty kinds are manufactured so as to satisfy the preferable material values of the embodiment 1, and the other ten kinds are manufactured within the non-preferable material values of the embodiment 1.

The results of the printing estimation are the same as those of the embodiment 1, it is confirmed that the material values of the ink which can perform the high density printing and make the printing frequency high are the same as the results of the embodiment 1.

(Embodiment 4)

Thirty kinds of inks are manufactured by the same manufacturing method of the ink as that of the embodiment 1.

Here, in the embodiment 4, the ink is manufactured by changing the constituting materials with respect to the embodiments 1 to 3.

That is, a transparent mixed solution is obtained by adding a vinyl acrylated polymer corresponding to an acrylate resin to a ISOPER (product name) corresponding to an isoparaffin hydro carbon manufactured by Exon Chemical and mixing and stirring at a room temperature until the vinyl acrylate polymer is completely dissolved. A color material dispersion ink having a color material density of 3 weight % is manufactured by inserting the mixed solution and Reflux Blue (product name) corresponding to a cyanogen color material manufactured by Clariant Co., Ltd. together with beads made of a zirconia into a crushing container made of an agate and mixing by a planetary type ball mill apparatus. In this case, the material values such as the volume resistivity, the average diameter of the color material and the like are controlled by the same method as that of the embodiment 1.

The inks are manufactured within the following material values.

| | |
|---|---|
| VOLUME RESISTIVITY | $10^8$–$5 \times 10^{13}$ Ωcm |
| AVERAGE DIAMETER OF COLOR MATERIAL | 0.05–5 μm |
| RATIO BETWEEN ζ ELECTRIC POTENTIAL AND VISCOSITY | 0–250 (mV/cp) |
| VISCOSITY | 1–30 cp |
| ζ ELECTRIC POTENTIAL | 0–400 mV |

For example, the ink having the constituting material mentioned above and the material values thereof will shown below.

| | |
|---|---|
| CONSTITUTING MATERIAL OF INK | |
| HYDRO CARBON SOLVENT (ISOPER G) | 93 WEIGHT % |
| Reflux Blue | 3 WEIGHT % |
| ACRYLATE RESIN | 3 WEIGHT % |
| NAPHTHENIC ACID MANGANESE | 1 WEIGHT % |

| | |
|---|---|
| MIXING TIME | 10 HOURS |
| MATERIAL VALUES OF INK | |
| VOLUME RESISTIVITY | $2 \times 10^{11}$ Ωcm |
| AVERAGE DIAMETER OF COLOR MATERIAL | 0.5 μm |
| RATIO BETWEEN ζ ELECTRIC POTENTIAL AND VISCOSITY | 20 (mV/cp) |
| VISCOSITY | 10 cp |
| ζ ELECTRIC POTENTIAL | 200 mV |

In this case, twenty kinds of inks among thirty kinds are manufactured so as to satisfy the preferable material values of the embodiment 1, and the other ten kinds are manufactured within the non-preferable material values of the embodiment 1.

The results of the printing estimation are the same as those of the embodiment 1, it is confirmed that the material values of the ink which can perform the high density printing and make the printing frequency high are the same as the results of the embodiment 1.

(Embodiment 5)

Twenty kinds of inks are manufactured by the same manufacturing method of the ink as that of the embodiment 1.

In the embodiment 5, the ink is manufactured by changing the constituting materials with respect to the embodiments 1 to 4.

That is, a transparent mixed solution is obtained by adding a vinyl acrylate ter polymer corresponding to an acrylate resin to an IP SOLVENT (product name) manufactured by Idemitsu Petrochemistry and mixing and stirring at a room temperature until the vinyl acrylate ter polymer is completely dissolved. A color material dispersion ink having a color material density of 3 weight % is manufactured by inserting the mixed solution and Black Pearls L (product name) corresponding to a cyanogen color material manufactured by Cabot Co., Ltd. together with beads made of a zirconia into a crushing container made of an agate and mixing by a planetary type ball mill apparatus. In this case, the material values such as the volume resistivity, the average diameter of the color material and the like are controlled by the same method as that of the embodiment 1.

The inks are manufactured within the following material values.

| | |
|---|---|
| VOLUME RESISTIVITY | $10^8$–$5 \times 10^{12}$ Ωcm |
| AVERAGE DIAMETER OF COLOR MATERIAL | 0.05–10 μm |
| RATIO BETWEEN ζ ELECTRIC POTENTIAL AND VISCOSITY | 0–250 (mV/cp) |
| VISCOSITY | 1.2–30 cp |
| ζ ELECTRIC POTENTIAL | 0–230 mV |

For example, the ink having the constituting material mentioned above and the material values thereof will shown below.

| | |
|---|---|
| CONSTITUTING MATERIAL OF INK | |
| HYDRO CARBON SOLVENT (IP SOLVENT) | 93 WEIGHT % |
| Black Pearls L | 3 WEIGHT % |
| ACRYLATE RESIN | 3 WEIGHT % |
| OCTYL ACID ZIRCONIUM | 1 WEIGHT % |
| MIXING TIME | 10 HOURS |

-continued

MATERIAL VALUES OF INK

| | |
|---|---|
| VOLUME RESISTIVITY | $5 \times 10^9$ Ωcm |
| AVERAGE DIAMETER OF COLOR MATERIAL | 0.5 μm |
| RATIO BETWEEN ζ ELECTRIC POTENTIAL AND VISCOSITY | 21.4 (mV/cp) |
| VISCOSITY | 7 cp |
| ζ ELECTRIC POTENTIAL | 150 mV |

In this case, fifteen kinds of inks among twenty kinds are manufactured so as to satisfy the preferable material values of the embodiment 1, and the other five kinds are manufactured within the non-preferable material values of the embodiment 1.

The results of the printing estimation are the same as those of the embodiment 1, it is confirmed that the material values of the ink which can perform the high density printing and make the printing frequency high are the same as the results of the embodiment 1.

As shown in the embodiments 1 to 5 mentioned above, in accordance with the present invention, the ink which can perform the high density printing even at the high printing frequency can be obtained by defining the material values of the ink without relation to the constituting materials of the ink.

Accordingly, the constituting material of the ink and the contained amount of each of the constituting materials, that is, the concentration are not specifically limited, however, they are preferably within the range explained in the embodiments.

Further, in accordance with the present embodiment, since the material values of only the ink are defined, it is needless to say that the usefulness of the ink of the present invention can be obtained in the other various kinds of electrostatic type ink jet heads than the head used in the present embodiments.

In this case, the ink in accordance with the present embodiment is described with respect to the color material particulars which are electrically charged in the positive potential, however, it may be an ink having color material particles which are electrically charged in a negative potential. In this case, the polarity of the set voltage in the discharge conditions may be set to an inverse polarity. That is, as far as the ratio between the ζ electric potential and the viscosity and the magnitude of the absolute value of the ζ electric potential are within the same range, the high density printing can be performed and the ink having the high printing frequency can be realized in the same manner as that of the present embodiment even in the ink which is electrically charged in the negative potential.

Accordingly, as far as the material values of the ink satisfy the conditions that the volume resistivity of the ink is between $10^9$ and $10^{12}$ Ωcm, the average diameter of the color material particles is between 0.1 and 2 μm, the absolute value of the ratio between the ζ electric potential and the viscosity of the color material particles is within the range between 10 and 100 (mV/cp), the viscosity of the ink is within the range between 2 and 20 cp, and the absolute value of the ζ electric potential of the color material particles is within the range between 30 mV and 200 mV.

As mentioned above, in accordance with the present invention, since the conditions are set such as to satisfy the volume resistivity of the ink between $10^9$ and $10^{12}$ Ωcm, the average diameter of the color material particles between 0.1 and 2 μm, the absolute value of the ratio between the ζ electric potential and the viscosity of the color material particulars between 10 and 100 (mV/cp), the viscosity of the ink between 2 and 20 cp, and the absolute value of the ζ electric potential of the color material particles between 30 mV and 200 mV, it is possible to obtain a useful effect that the high quality image can be stably obtained by the high density printing even at the high printing frequency.

What is claimed is:

1. An ink for an electrostatic ink jet device comprising an ink tank which holds an ink obtained by dispersing a color material particle in an insulative solvent and which includes a slit hole or a nozzle hole which communicates with an interior of said ink tank and from which said ink is discharged, a migration electrode which transfers said color material particle in said ink due to an electrophoresis, and a printing electrode which discharges said color material particle and said insulative solvent migrated by said migration electrode from said slit hole or said nozzle hole, said ink comprising:

an insulative solvent having a volume resistivity equal to or more than $10^{10}$ Ωcm, a color material particle which can be electrically charged, and an electric charge controlling agent which electrically charges said color material particle to a predetermined polarity, and the following material values A to E are provided:

A: a volume resistivity of said ink is $10^9$ to $10^{12}$ Ωcm;

B: an average diameter of said color material particle is between 0.1 and 2 μm;

C: an absolute value of a ratio (ξ electric potential/viscosity) between a ξ electric potential and a viscosity of said color material particle is 10 to 100 (mV/cp);

D: a viscosity of said ink is 2 to 20 cp; and

E: an absolute value of the ξ electric potential of said color material particle is 30 mV to 200 mV.

2. An ink as claimed in claim 1, wherein said relative solvent is an isoparaffin hydro carbon.

3. An ink as claimed in claim 2, wherein a boiling point of said isoparaffin hydro carbon is within a range between 150 and 350° C.

4. An ink as claimed in claim 1, wherein a concentration of said color material particles is within a range between 1.5 and 10 weight % with respect to a total amount of the ink.

5. An ink as claimed in claim 1, wherein said electric charge controlling agent is a metallic soap of a naphthenic acid or an octyl acid.

* * * * *